United States Patent
Suchy et al.

(10) Patent No.: US 10,771,281 B1
(45) Date of Patent: Sep. 8, 2020

(54) SEMI-DIFFERENTIAL SIGNALING FOR DSI3 BUS ENHANCEMENT

(71) Applicant: SEMICONDUCTOR COMPONENTS INDUSTRIES, LLC, Phoenix, AZ (US)

(72) Inventors: Tomas Suchy, Brno (CZ); Lukas Vykydal, Olomouc (CZ); Pavel Hartl, Brno (CZ); Marek Hustava, Bratislava (SK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/673,607

(22) Filed: Nov. 4, 2019

(51) Int. Cl.
*H04B 3/00* (2006.01)
*H04L 12/40* (2006.01)
*H04L 25/02* (2006.01)

(52) U.S. Cl.
CPC .... *H04L 12/40045* (2013.01); *H04L 25/0272* (2013.01); *H04L 2012/40273* (2013.01)

(58) Field of Classification Search
CPC ........... H04L 12/40045; H04L 25/0272; H04L 2012/40273
USPC ........................................................ 375/257
See application file for complete search history.

(56) References Cited

U.S. PATENT DOCUMENTS

| | | | | |
|---|---|---|---|---|
| 4,328,586 A | * | 5/1982 | Hansen | H04Q 9/14 340/870.11 |
| 6,154,498 A | * | 11/2000 | Dabral | G06F 13/4072 327/141 |
| 8,473,535 B2 | | 6/2013 | Perumana et al. | |
| 2007/0237322 A1 | * | 10/2007 | Hussain | H04L 12/40045 379/413 |
| 2012/0008431 A1 | * | 1/2012 | Lee | G11C 5/147 365/191 |
| 2012/0249013 A1 | * | 10/2012 | Valois | H05B 45/10 315/291 |

(Continued)

FOREIGN PATENT DOCUMENTS

| EP | 1505787 A2 | 2/2005 |
|---|---|---|
| KR | 20000004924 A | 1/2000 |

OTHER PUBLICATIONS

Denso Corporation, Freescale Semiconductor Inc. and TRW Automotive Inc., "DSI3 Bus Standard," Revision 1.00, Feb. 16, 2011, 45 pages.

(Continued)

*Primary Examiner* — Don N Vo
(74) *Attorney, Agent, or Firm* — Ramey & Schwaller, LLP

(57) ABSTRACT

A semi-differential signaling technique as well as bus devices and communication systems that exploit this technique to enhance the performance of the DSI3 bus. In one embodiment, there is provided a DSI3 master device that can be coupled to a DSI3 slave device via a bus having at least a power supply conductor, a power return conductor, and a signal conductor. The master device includes: a power supply node and a power return node that respectively connect to the power supply conductor and the power return conductor to supply power to the slave device; a signal node that connects to the signal conductor; and a driver that drives the signal node relative to a reference voltage midway between voltages of the power supply node and the power return node.

14 Claims, 5 Drawing Sheets

(56) References Cited

U.S. PATENT DOCUMENTS

2015/0035477 A1* 2/2015 Wong .................... H02J 7/0068
320/107
2019/0181853 A1* 6/2019 Kobayashi ........... H03K 17/162

OTHER PUBLICATIONS

David Levy, "DSI3 Sensor to master current threshold adaptation for pattern recognition", Int. J. Sig. Proc. Sys., Dec. 2013, v.1 n.2, pp. 141-145.
Marek Hustava et al., "Slave Device Enhancing Data Rate of DSI3 Bus," U.S. Appl. No. 16/359,693, filed Mar. 20, 2019, 28 pages.
LIN Consortium, LIN Specification Package, Revision 2.1, 2006, 209 pages.

* cited by examiner

SEMI-DIFFERENTIAL SIGNALING FOR DSI3 BUS ENHANCEMENT

The present application claims priority to U.S. application Ser. No. 16/359,693, filed 2019 Mar. 20 and titled "Slave Device Enhancing Data Rate of DSI3 Bus" by inventors Marek Hustava, Tomas Suchy, Lukas Vykydal, and Pavel Hartl, which is hereby incorporated herein by reference.

BACKGROUND

Current and future vehicles are incorporating increasing numbers of on-board sensors and systems to enable or aid critical vehicle functions including Adaptive Cruise Control (ACC), Parking Assistance, Forward Collision Warning (FCW), Forward Collision with Active Braking, Blind Spot Warning (BSW), Lane Keeping Systems (LKS), and others. These technologies provide direct driver assistance in normal driving and critical scenarios, and some are even capable of enhancing driver control or providing autonomous control to prevent or mitigate a crash or negative outcome.

To accommodate the many sensors, actuators, and control systems being employed for such features, manufacturers are implementing increasingly sophisticated data communication networks in each vehicle. The 3rd generation Distributed System Interface (DSI3) standard published by the DSI Consortium (dsiconsortium.org) provides one example of such a communication network.

DSI3 and other communication standards must contend with a unique set of circumstances that challenge their performance. The networks are portable, battery powered (i.e., low voltage), with wire runs long enough to cause (and be susceptible to) electromagnetic interference (EMI). The networks should be resistant to vibration effects, yet remain inexpensive and easy to repair. The DSI3 standard has thrived by offering a number of desirable features including single-conductor communication with optionally integrated power delivery. However, the signal conductor is unshielded and carries a single-ended (as opposed to differential) unipolar signal. Various efforts are underway to increase data communication performance across the DSI3 bus's single signal conductor.

SUMMARY

Accordingly, there is disclosed herein a semi-differential signaling technique as well as bus devices and communication systems that exploit this technique to enhance the performance of the DSI3 bus. In one embodiment, there is provided a DSI3 master device that can be coupled to a DSI3 slave device via a bus having at least a power supply conductor, a power return conductor, and a signal conductor. The master device includes: a power supply node and a power return node that respectively connect to the power supply conductor and the power return conductor to supply power to the slave device; a signal node that connects to the signal conductor; and a driver that drives the signal node relative to a reference voltage midway between voltages of the power supply node and the power return node.

In another embodiment, there is provided a DSI3 slave device that can be coupled to a DSI3 master device via a bus. The slave device includes: a power supply node and a power return node that respectively connect to the power supply conductor and the power return conductor to receive power from the master device; a signal node that connects to the signal conductor; and a receiver that senses a voltage of the signal node relative to a reference voltage midway between voltages of the power supply node and the power return node.

An illustrative communication system embodiment includes both the DSI3 master and the DSI3 slave devices as described above.

An illustrative embodiment of a semi-differential signaling method includes: supplying power to a slave device via current flow through a power supply conductor and a power return conductor; deriving a reference voltage midway between voltages of a power supply terminal and a power return terminal, the power supply terminal being connected to the power supply conductor and the power return terminal being connected to the power return conductor; and driving voltage of a signal conductor relative to the reference voltage to communicate data to the slave device.

Each of the foregoing embodiments may be employed separately or conjointly, and may optionally include one or more of the following features in any suitable combination: 1. a transceiver that maintains physical compatibility with the DSI3 (3rd generation distributed system interface) standard while supporting semi-differential signaling when employed in conjunction with a compatible slave device. 2. a voltage divider that derives the reference voltage from the voltages of the power supply node and the power return node. 3. an analog-to-digital converter that uses the reference voltage as a zero point. 4. a differential amplifier having the reference voltage and the voltage of the signal node coupled to its inputs. 5. a differential amplifier with an impedance configuration that offsets the sensed signal node voltage by half a voltage of the power supply node. 6. the power return conductor connects to ground at no more than one point to ensure current flow via the power supply conductor returns via the power return conductor.

DETAILED DESCRIPTION

The attached drawings and following description set out particular embodiments and details for explanatory purposes, but It should be understood that the drawings and corresponding detailed description do not limit the disclosure. On the contrary, they provide a foundation that, together with the understanding of one of ordinary skill in the art, discloses and enables all modifications, equivalents, and alternatives falling within the scope of the appended claims.

Figure 1A:
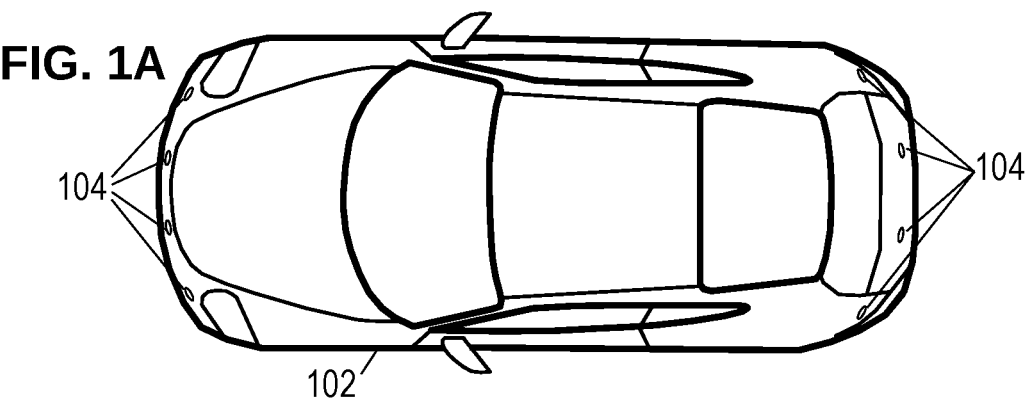
FIG. 1A is an overhead view of an illustrative vehicle equipped with sensors.

FIG. 1A shows an illustrative vehicle 102 equipped with a set of ultrasonic sensors 104 for advanced driver assistance. The number and configuration of sensors in the sensor arrangement varies, and it would not be unusual to have eight sensors on each bumper with six additional sensors on each side for zone monitoring. Other sensor types may be employed in the sensor arrangement, such as radar antenna arrays mounted behind the covers of the front and rear bumpers. The vehicle may employ the sensor arrangement for detecting and measuring distances to objects in the various detection zones, using the sensors for individual measurements as well as cooperative (e.g., triangulation) measurements. With suitable processing techniques, the sensor arrangement can be used to detect and track directions and distances of multiple obstacles, including their relative velocities and motion vectors.

The ultrasonic sensors are transceivers, meaning that each sensor can transmit and receive pulses of ultrasonic sound. Emitted pulses propagate outward from the vehicle until they encounter and reflect from an object or some other form of acoustic impedance mismatch. The reflected pulses return to the vehicle as "echoes" of the emitted pulses. The times between the emitted pulses and received echoes (aka "times of flight") are indicative of the distances to the reflection points. In some implementations only one sensor transmits at a time, though all of the sensors may be configured to measure the resulting echoes. In other implementations, multiple sensors transmit concurrently, relying on different frequencies or waveforms to distinguish the echoes from different sources.

Figure 1B:
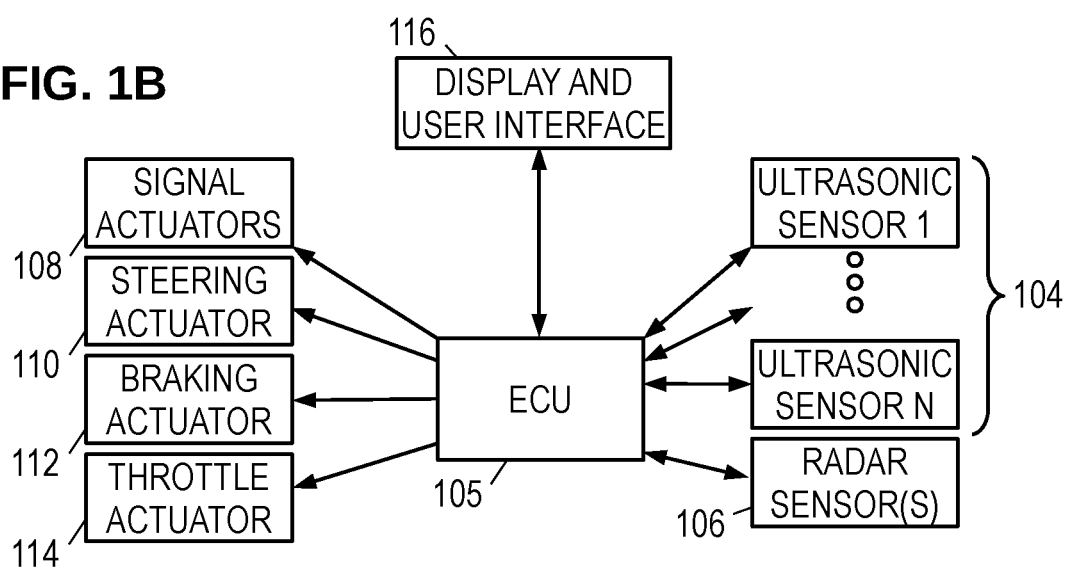
FIG. 1B is a block diagram of an illustrative data communication network.

FIG. 1B shows an electronic control unit (ECU) 105 coupled to the various ultrasonic sensors 104 and a radar sensor 106 as the center of a star topology. Of course, other topologies including serial, parallel, and hierarchical (tree) topologies, are also suitable and contemplated for use in accordance with the principles disclosed herein. The radar sensor 106 couples to transmit and receive antennas in a radar antenna array to transmit electromagnetic waves, receive reflections, and determine a spatial relationship of the vehicle to its surroundings. To provide automated parking, assisted parking, lane-change assistance, obstacle and blind-spot detection, autonomous driving, and other advanced driver assistance features, the ECU 105 may further connect to a set of actuators such as a turn-signal actuator 108, a steering actuator 110, a braking actuator 112, and throttle actuator 114. ECU 105 may further couple to a user-interactive interface 116 to accept user input and provide a display of the various measurements and system status.

Various standards exist to support communications between the ECU 105 and the various sensors and actuators. Of particular interest with respect to the present disclosure is the 3rd generation Distributed System Interface (DSI3) bus standard, which provides for half-duplex single-ended signal communication between a bus master device (typically the ECU) and one or more slave devices (e.g., the sensors and actuators). Because the DSI3 bus requires only one signal conductor, it may at times be referred to as a "one-wire" bus.

Figure 2A:
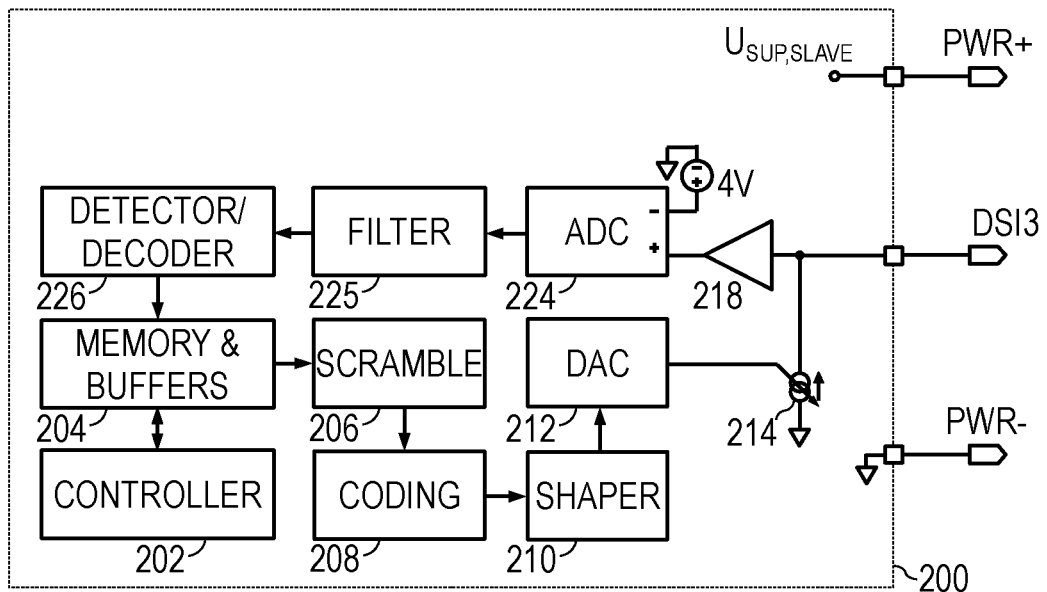
FIG. 2A is a block diagram of an illustrative slave device for a DSI3 bus.

FIG. 2A is a block diagram of an illustrative slave device 200 suitable for use on a standard DSI3 bus. Slave device 200 may be part of, or attached to, a sensor such as the ultrasonic or radar sensors described above. Slave device 200 includes a controller 202 that collects sensor measurements and buffers relevant messages in memory 204 for communicating the measurement data to the bus master device, which may be part of, or attached to, an ECU. While the message length can be varied, in at least one contemplated embodiment each message is 16 bytes and may begin with or be preceded by a preamble that is one or two nibbles in length. A scrambler 206 masks each message with a pseudorandom binary sequence using a bitwise exclusive-or (XOR) operation to randomize or "whiten" any repeating data patterns. If present, the preamble is not masked, so as to preserve the preamble pattern in the scrambler's output bitstream. The seed for the pseudorandom sequence may vary for each message and may vary for each slave device.

A channel encoder 208 encodes the bitstream from the scrambler 206 by mapping each nibble to a corresponding triplet of channel symbols. Each triplet includes three ternary channel symbols. Channel symbols are also referred to herein as "chips" and are transmitted as one of three unipolar non-return-to-zero levels: 0, 1, or 2, each symbol having a fixed symbol duration which may be about 3 or 4 microseconds. As provided in the standard, "0" may correspond to a quiescent channel signal current of $I_Q$. A "1" may correspond to a response channel signal current of $I_Q+I_{RESP}$, and a "2" may correspond to a response channel signal current of $I_Q+2I_{RESP}$. In at least some embodiments, $I_Q$ is limited to no more than 2 mA, and $I_{RESP}$ is approximately 12 mA. Some contemplated embodiments may switch from three-level signaling to two level signaling to improve noise immunity. In such embodiments, the channel encoder 208 maps 8-bit bytes to 8-bit codewords, in this case only $I_Q$ and $I_Q+2I_{RESP}$ current levels are used.

A pulse-shaping filter 210 may operate on the channel symbol stream from the encoder 208, providing a transfer function that converts rectangular pulses (e.g., NRZ chips) into smoother pulse shapes that provide the channel signal with more desirable spectral properties. One contemplated embodiment of the pulse-shaping filter 210 is a sinc filter, but other pulse shapes with raised-cosine roll-offs are also contemplated. More specifically, the contemplated pulse shaping filter types include a Hann filter, a Hamming filter, a Blackman filter, and a Nuttall filter. A digital-to-analog converter 212 operates on the filtered channel signal to convert it from digital form to analog form, which herein may be termed the uplink channel signal. A channel driver 214 converts the uplink channel signal into an electrical current on an input/output signal terminal of the slave device 200.

During the downlink communication phase, the input/output signal terminal receives a downlink channel signal in the form of an electrical voltage signal. Receive buffer 218 provides a high input impedance for the input/output signal terminal, buffering the downlink channel signal for the analog-to-digital converter 224. A downlink receive filter 225 may limit the digital receive signal bandwidth and/or enhance signal to noise ratio of the downlink signal. In at least some embodiments, the filter 225 operates to suppress noise above 300 kHz. A symbol detector and decoder 226 operates on the filtered receive signal to determine the command type and associated payload, placing the information in the receive buffer for the controller 202 to use when formulating a response.

Slave device 200 may draw power for its operation from a power supply terminal (PWR+), coupling the voltage from the power supply terminal to an internal power supply node from which the various electronic components of the slave device may be powered. To close the current loop from the power source, the slave device's internal ground node is coupled to a power return terminal (PWR−). The voltage of the internal supply node, represented as $U_{SUP,SLAVE}$, is measured relative to the internal ground node. The power supply terminal (PWR+), the power return terminal (PWR−), and the signal terminal (DSI3) may be coupled to corresponding conductors of a point-to-point bus or of a one-to-many bus.

Figure 2B:
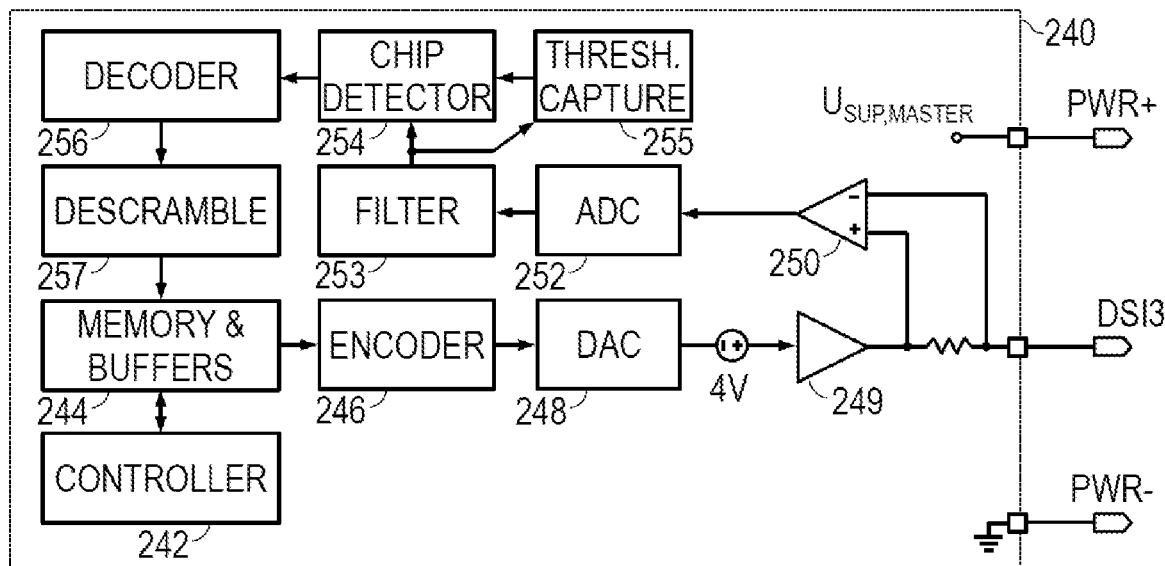
FIG. 2B is a block diagram of an illustrative master device for a DSI3 bus.

FIG. 2B is a block diagram of an illustrative bus master device 240 suitable for use on a standard DSI3 bus. It includes a power supply terminal (PWR+) and a power return terminal (PWR−) that couple internal power supply and ground nodes to corresponding conductors to power the slave device 200. A signal terminal (DSI3) is also provided for coupling to the bus's signal conductor.

Master device 240 includes a controller 242 that formulates downlink messages in memory 244 for communication to the slave device 200. A channel encoder 246 encodes the binary downlink messages by mapping bits 0 and 1 to upward and downward channel voltage transitions as provided by, e.g., Manchester-1 encoding. A digital-to-analog converter 248 converts the encoded signal into an analog downlink signal. A DC-level shifter (shown as a 4 volt voltage source) raises the DC voltage of the analog downlink signal to a default voltage level compliant with the DSI3 standard. A driver 249 supplies the analog downlink signal as a voltage signal to an input/output signal terminal of the master device 240. Though the DSI3 standard provides for a 2 volt swing between "high" and "low" symbol voltages, some contemplated embodiments employ a 4 volt swing to enhance noise immunity.

The voltage signal produced by driver 249 is conveyed to the input/output signal terminal via a resistance suitable for sensing an uplink signal conveyed to the input/output signal terminal as a current signal. A high impedance receive buffer 250 couples the uplink signal from the input/output signal terminal to an analog to digital converter 252, which digitizes the uplink signal, and an uplink receive filter 253 that operates on the digital signal to limit signal bandwidth and/or enhance signal-to-noise ratio. Filter 253 may be a matched filter, having a filter response based at least in part on the pulse shape provided by the pulse shaping filter 210. A chip detector 254 operates on the filtered uplink signal to detect channel symbol levels. A threshold capture unit 255 may capture and/or adapt comparator threshold levels for the chip detector 254 based at least in part on the message preambles as discussed further below. A decoder 256 operates on the channel symbol sequence from the chip detector 254, inverting the operation of encoder 208 to map the chip triplets to binary nibbles. A descrambler 257 operates on the bitstream from the decoder 256, inverting the operation of the scrambler 206 to extract the message data sent by the slave device. The message data may be stored in memory 244 for analysis and use by controller 242.

Figure 2C:
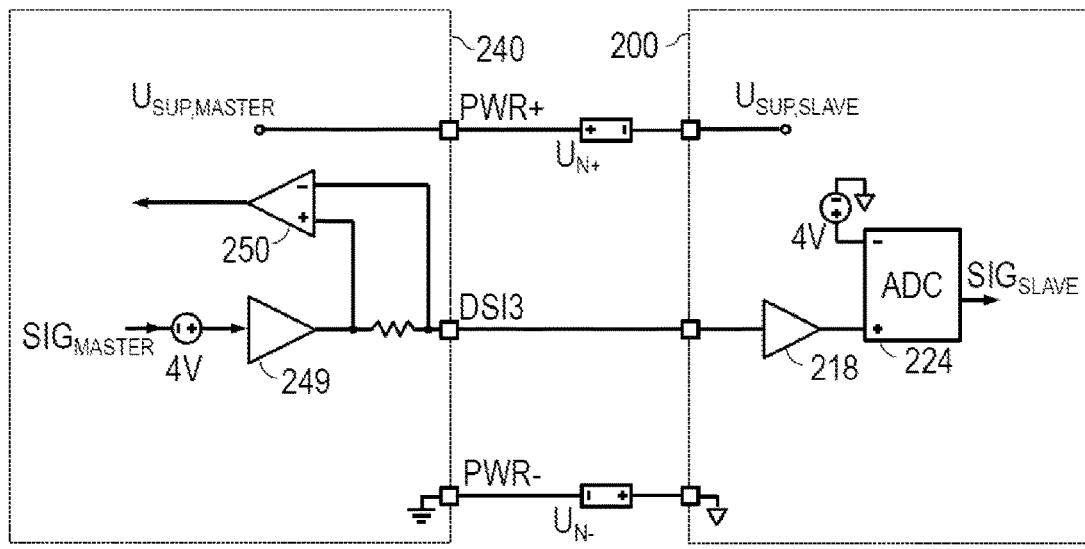
FIG. 2C is a simplified circuit showing downlink signal communication.

When slave device 200 is coupled to master device 240, the slave device 200 is subject to ground drift, potentially lowering the signal to noise ratio of the downlink signal channel. To illustrate the issue, FIG. 2C provides a simplified schematic showing the operation of the bus as employed for downlink signal communication. Current flowing in the power supply and power return conductors creates noise voltages $U_{N+}$, and $U_{N-}$, respectively. As a consequence, the power supply node voltages of master and slave are related by the following equation:

$$U_{SUP,MASTER} = U_{N+} + U_{SUP,SLAVE} + U_{N-}$$

If the power supply conductor and power return conductor have similar properties (i.e., similar impedance) and carry equal currents (i.e., there is negligible current flow in the signal conductor and no ground loop current flow), then the noise voltages are essentially equal such that $$U_{SUP,MASTER} = U_{SUP,SLAVE} + 2U_N, \text{ and}$$

$$U_N = (U_{SUP,MASTER} - U_{SUP,SLAVE})/2$$

Representing the signal voltage transmitted by the master as $SIG_{MASTER}$, the signal voltage sensed by the slave device $SIG_{SLAVE}$ may be determined as:

$$SIG_{MASTER} + 4V = SIG_{SLAVE} + 4V + U_N$$

$$SIG_{SLAVE} = SIG_{MASTER} - U_N$$

In words, the downlink signal voltage sensed by the slave device is reduced by the ground drift noise voltage.

It is observed herein that the noise voltages $U_{N+}$, and $U_{N-}$ are typically equal, causing symmetric effects on the slave's power supply and power return terminal voltages. Consequently, a greater degree of noise immunity can be achieved if, rather than using the ground node as a reference for signal transmission and reception, the slave and master devices use a half-voltage reference. That is, the master device splits the difference between its supply voltage and ground voltage to determine the reference voltage for transmitting the downlink signal, and the slave device splits the difference between its supply voltage and ground voltage to determine the reference voltage for receiving the downlink signal. As a consequence, the signal conductor is no longer driven and sensed in a purely single-ended fashion, nor is it converted into a conventional differential signal, but in effect it is driven and sensed relative to the average of the power supply and power return conductor voltages. This signaling technique is herein referred to as "semi-differential signaling".

Figure 3A:
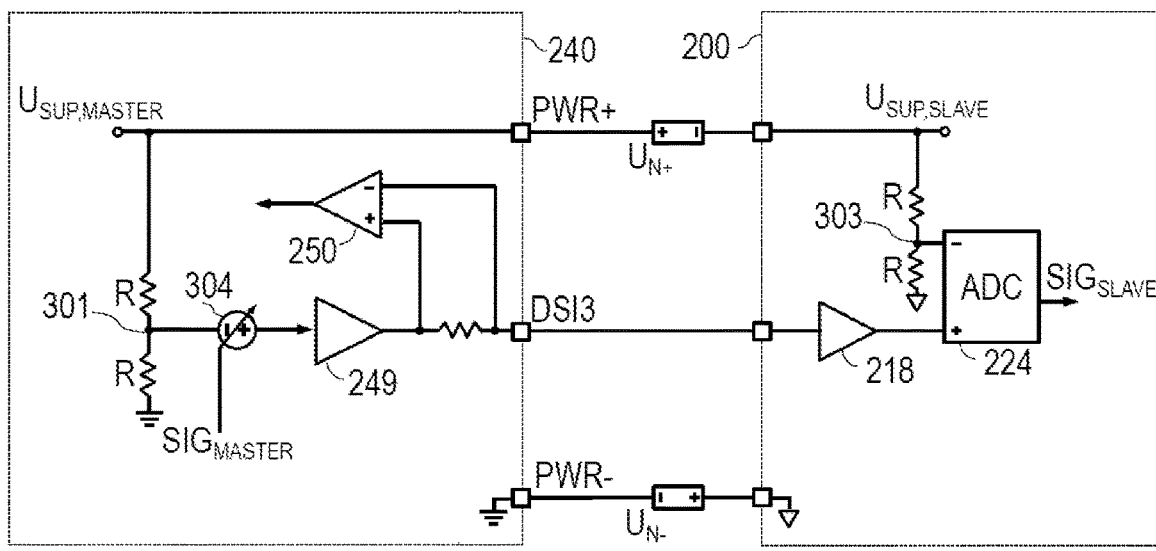
FIG. 3A is an illustrative schematic of a first illustrative semi-differential signaling configuration.

FIG. 3A is an illustrative schematic of a first illustrative semi-differential signaling configuration for the master and slave devices. Master device 240 employs a voltage divider consisting of two equal resistors R coupled in series between the internal power supply node and the internal ground node. The intermediate connection between the two resistors provides a reference voltage node 301 having a voltage midway between the power supply and power return terminal voltages. Similarly, slave device 200 employs a voltage divider to create a reference voltage node 303 having a voltage midway between the slave device's power supply and power return terminal voltages. Reference voltage node 303 is shown coupled to the zero point reference input of analog to digital converter 224. A variable voltage source 304 drives the signal terminal relative to the reference voltage node.

The master and slave signal voltages may now be related as:

$$SIG_{MASTER} + (U_{SUP,MASTER}/2) = SIG_{SLAVE} + (U_{SUP,SLAVE}/2) + U_N$$

$$SIG_{SLAVE} = SIG_{MASTER} - U_N + (U_{SUP,MASTER} - U_{SUP,SLAVE})/2$$

$$SIG_{SLAVE} = SIG_{MASTER}$$

The equality follows because the noise voltage UN was previously established to be equal to half the difference in power supply voltages. In this fashion, the noise voltage in the power conductors can be compensated, maximizing the downlink signal's noise immunity.

The embodiment of FIG. 3A is illustrative; there are numerous suitable ways to generate a reference voltage midway between the power supply and power return voltages which can be found in the literature or will be known to those skilled in the art. Likewise, there are numerous suitable ways to drive a signal conductor relative to such a reference voltage and to sense a received signal relative to such a reference voltage. As one example, the driver may include an operational amplifier in a non-inverting amplifier configuration in which the reference voltage is supplied to an inverting input of the operational amplifier. As another example, the driver may be a transimpedance amplifier having an input node supplied with a current proportional to an output voltage signal and a negative current proportional to half a power supply node voltage. With regard to alternative sensing arrangements, FIG. 3B shows one suitable variation.

Figure 3B:
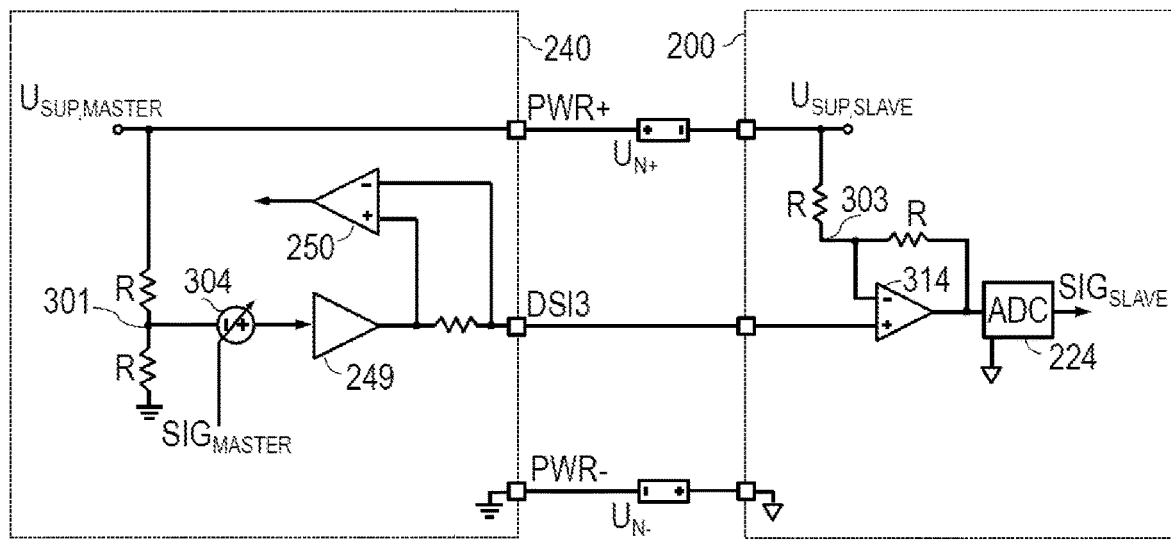
FIG. 3B is an illustrative schematic of a second illustrative semi-differential signaling configuration.

In the embodiment of FIG. 3B, master device 240 uses reference node 301 to bias a variable voltage source 304 supplying the transmit signal to the signal terminal (via driver 249). Slave device 200 employs an operational amplifier 314 configured as an non-inverting amplifier with the op-amp's inverting input coupled to an intermediate node 303 of a voltage divider between the supply voltage $U_{SUP, SLAVE}$ and the op amp's output voltage. In effect, the voltage divider causes the op amp to subtract half of the supply voltage from the input signal voltage. An analog-to-digital converter 224 digitizes the op-amp's output.

Figure 3C:
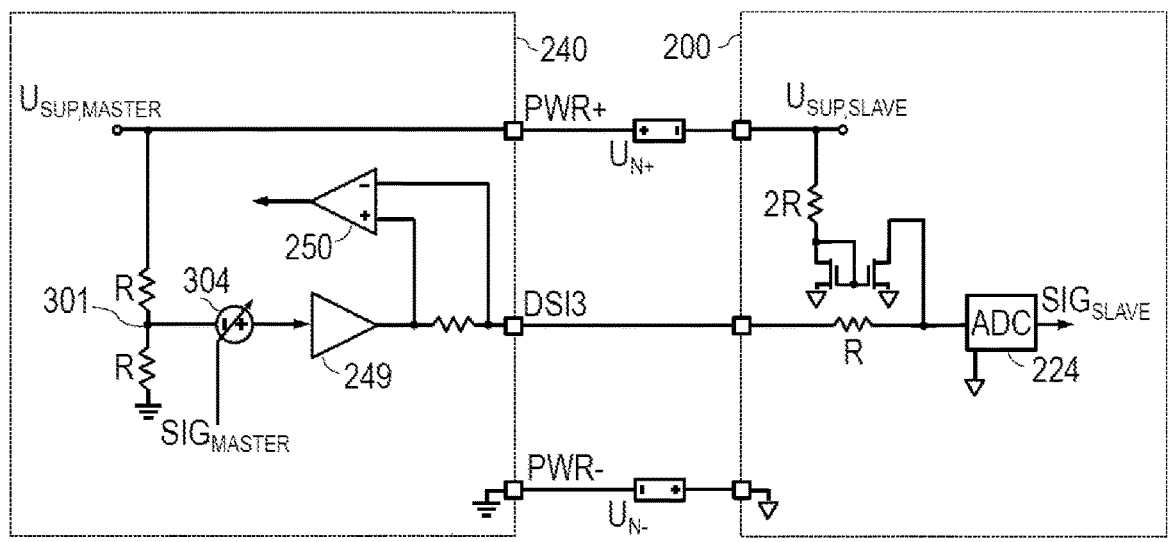
FIG. 3C is an illustrative schematic of a third illustrative semi-differential signaling configuration.

FIG. 3C shows an embodiment of slave device 200 that is similar to that of FIG. 3B, but with a current mirror arrangement that causes a current proportional to half the supply voltage to be drawn from the ADC input even as a current proportional to the input signal voltage is supplied to the ADC input via the resistor R. Thus there exist many potential implementations of the semi-differential signaling and semi-differential detection technique.

Figure 3D:
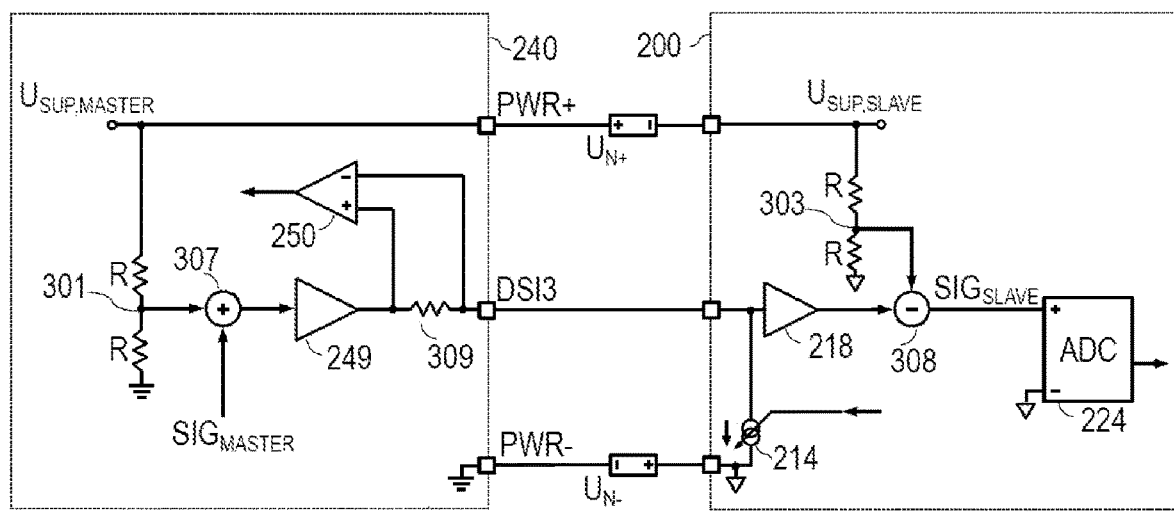
FIG. 3D is an illustrative schematic of a fourth illustrative semi-differential signaling configuration.

To generalize the underlying principles, FIG. 3D shows yet another embodiment of the master and slave devices, in which node 301 provides a master reference voltage midway between the supply voltage and ground. Element 307 is an analog adder of any suitable implementation, and element 249 is a unity gain buffer offering a high input impedance and a low output impedance (e.g., about 1 Ohm). Element 309 is a DSI3 line current sense resistor with a suitably low impedance (e.g. 5 Ohm) Element 250 is a differential amplifier that amplifies the voltage drop over resistor 309 (caused by DSI3 line current from the slave transmitter 214) to voltage suitable for ADC 252. Element 218 is an optional unity gain buffer, again offering a high input impedance to minimize loading of the DSI3 line. Element 308 is an analog subtractor of any suitable implementation. Node 303 provides a slave reference voltage midway between the supply voltage and ground.

Because the DSI3 standard does not require a specific bias voltage (or reference voltage) for the signal conductor, the embodiments represented by FIGS. 3A-3D can maintaining physical compatibility with the DSI3 standard, and may optionally adjust the bias and reference voltages to accommodate the abilities of the device to which they are coupled. If both master and slave devices support the use of semi-differential signaling, they may be configured to use such signaling to improve system performance.

These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A master device that couples to a slave device via a bus having at least a power supply conductor, a power return conductor, and a signal conductor, the master device comprising:

a power supply node and a power return node that respectively connect to the power supply conductor and the power return conductor to supply power to the slave device;

a signal node that connects to the signal conductor; and a driver that drives the signal node relative to a reference voltage midway between voltages of the power supply node and the power return node.

2. The master device of claim 1, wherein the driver is part of a transceiver that maintains physical compatibility with the DSI3 (3rd generation distributed system interface) standard while supporting semi-differential signaling when employed in conjunction with a compatible slave device.

3. The master device of claim 1, further comprising a voltage divider that derives the reference voltage from the voltages of the power supply node and the power return node.

4. A slave device that couples to a master device via a bus having at least a power supply conductor, a power return conductor, and a signal conductor, the slave device comprising:

a power supply node and a power return node that respectively connect to the power supply conductor and the power return conductor to receive power from the master device;

a signal node that connects to the signal conductor; and a receiver that senses a voltage of the signal node relative to a reference voltage midway between voltages of the power supply node and the power return node.

5. The slave device of claim 4, wherein the receiver is part of a transceiver that maintains physical compatibility with the DSI3 (3rd generation distributed system interface) standard while supporting semi-differential signaling when employed in conjunction with a compatible master device.

6. The slave device of claim 4, further comprising a voltage divider that derives the reference voltage from the voltages of the power supply node and the power return node.

7. The slave device of claim 6, wherein the receiver includes an analog-to-digital converter that uses the reference voltage as a zero point.

8. The slave device of claim 6, wherein the receiver includes a differential amplifier having the reference voltage and the voltage of the signal node coupled to its inputs.

9. The slave device of claim 4, wherein the receiver includes a differential amplifier with an impedance configuration that offsets the sensed signal node voltage by half a voltage of the power supply node.

10. A communication system comprising:

a slave device; and a master device coupled to the slave device via a bus having at least a power supply conductor, a power return conductor, and a signal conductor, the master device comprising:

a power supply node and a power return node that respectively connect to the power supply conductor and the power return conductor;

a signal node that connects to the signal conductor; and a driver that drives the signal node relative to a reference voltage midway between voltages of the master device's power supply node and the master device's power return node;

the slave device comprising:

a power supply node and a power return node that respectively connect to the power supply conductor and the power return conductor;

a signal node that connects to the signal conductor; and a receiver that senses a voltage of the signal node relative to a reference voltage midway between voltages of the slave device's power supply node and the slave device's power return node.

11. The communication system of claim 10, wherein the power return conductor connects to ground at no more than one point to ensure current flow via the power supply conductor returns via the power return conductor.

12. A semi-differential signaling method that comprises:
supplying power to a slave device via current flow through a power supply conductor and a power return conductor; and
driving a voltage of a signal conductor relative to a reference voltage midway between voltages of the power supply conductor and the power return conductor, said driving operating to communicate data to the slave device.

13. The method of claim 12, further comprising: deriving a reference voltage midway between voltages of a power supply terminal and a power return terminal, the power supply terminal being connected to the power supply conductor and the power return terminal being connected to the power return conductor.

14. The method of claim 13, wherein said deriving employs a voltage divider coupled between the power supply terminal and the power return terminal.

* * * * *